United States Patent
Winn

(10) Patent No.: US 10,060,460 B1
(45) Date of Patent: Aug. 28, 2018

(54) PRECURSOR FOR A FURRING CHANNEL CLIP, FURRING CHANNEL CLIP FORMED THEREFROM, METHOD OF MAKING A FURRING CHANNEL CLIP, AND METHOD OF MOUNTING A FURRING CHANNEL TO A LOAD BEARING MEMBER

(71) Applicant: Brandon C. Winn, Robbinsville, NJ (US)

(72) Inventor: Brandon C. Winn, Robbinsville, NJ (US)

(73) Assignees: Brandon C. Winn, Robbinsville, NJ (US); Ken Huber, Seattle, WA (US)

( * ) Notice: Subject to any disclaimer, the term of this patent is extended or adjusted under 35 U.S.C. 154(b) by 5 days.

(21) Appl. No.: 15/641,730

(22) Filed: Jul. 5, 2017

(51) Int. Cl.
  *F16B 7/04* (2006.01)
  *E04B 1/41* (2006.01)
  *E04B 9/18* (2006.01)
  *E04B 1/38* (2006.01)

(52) U.S. Cl.
  CPC .............. *F16B 7/0473* (2013.01); *E04B 1/40* (2013.01); *E04B 9/18* (2013.01); *E04B 2001/405* (2013.01)

(58) Field of Classification Search
  CPC .... F16B 7/0473; F16B 7/0493; F16B 7/0446; E04B 9/18; E04B 9/16; E04B 9/26; E04B 9/12; E04B 9/122; E04B 9/125; E04B 1/40; E04B 2001/405; E04B 1/2403;
  (Continued)

(56) References Cited

U.S. PATENT DOCUMENTS 940,609 A * 11/1909 Newberry ............. E04B 1/2403
  403/217
1,130,722 A * 3/1915 Fletcher .................... E04B 2/58
  52/355

(Continued)

FOREIGN PATENT DOCUMENTS

DE     4335000 C2 *  6/1998  ............... E04B 9/16
DE    10249783 B3 *  1/2004  ............... E04B 9/16

(Continued)

OTHER PUBLICATIONS

Web pages of Suspended Ceiling Accessories C Channel Furring Channel from Shenzhen Pennon Decoration Materials Co., Ltd. dated May 21, 2009, https://szpennon.en.alibaba.com/product/236615839-802455399.

(Continued)

*Primary Examiner* — Ryan D Kwiecinski
*Assistant Examiner* — Matthew J Gitlin
(74) *Attorney, Agent, or Firm* — Caesar Rivise, PC

(57) ABSTRACT

Disclosed is a precursor for a clip and a clip formed by the precursor. The clip is configured for mounting a furring channel to a load-bearing member and is a generally U-shaped member having a pair of sidewalls, each of which includes a pair of tabs projecting therefrom. The clip is arranged to receive the load-bearing member between its sidewalls, such that the tabs can be snap-fit under inwardly directed flanges of the furring channel. Also disclosed is a method of forming the clip from the precursor, by bending portions of the precursor to form the sidewalls of the clip, and a method for mounting a furring channel onto a load-bearing member using the clip.

13 Claims, 4 Drawing Sheets

(58) Field of Classification Search
CPC ..... E04B 2001/2415; E04B 2001/2448; E04B 2/58; E04F 13/0805; E04F 13/0812
USPC .................. 52/712, 714, 715, 235, 655.1
See application file for complete search history.

(56) References Cited

U.S. PATENT DOCUMENTS

| | | | | |
|---|---|---|---|---|
| 2,181,885 | A * | 12/1939 | Goldsmith | E04B 1/5818 |
| | | | | 403/394 |
| 4,245,446 | A * | 1/1981 | Judkins | E04B 9/26 |
| | | | | 52/1 |
| 4,572,694 | A * | 2/1986 | Hoeksema | E04B 2/766 |
| | | | | 403/187 |
| 5,716,155 | A * | 2/1998 | Yoshida | B62D 23/005 |
| | | | | 403/187 |
| 2003/0089069 | A1* | 5/2003 | Babich | E04B 1/2403 |
| | | | | 52/693 |
| 2006/0255225 | A1* | 11/2006 | Nicoletti | E04B 2/766 |
| | | | | 248/316.7 |
| 2009/0003929 | A1* | 1/2009 | Rudduck | B64D 11/0696 |
| | | | | 403/348 |
| 2014/0003861 | A1* | 1/2014 | Cheung | F24J 2/5256 |
| | | | | 403/291 |
| 2014/0093307 | A1* | 4/2014 | Zhang | F16B 9/023 |
| | | | | 403/188 |
| 2015/0337538 | A1* | 11/2015 | Florenske | E04F 13/0812 |
| | | | | 52/481.1 |
| 2016/0215494 | A1* | 7/2016 | Pilz | E04B 2/02 |
| 2017/0044767 | A1* | 2/2017 | Gloftis | E04B 9/183 |

FOREIGN PATENT DOCUMENTS

| | | | | |
|---|---|---|---|---|
| DE | 202014101153 U1 * | 5/2014 | ............ | F24J 2/5247 |
| EP | 1413692 B1 * | 12/2009 | ............... | E04B 9/16 |
| EP | 2369082 A2 * | 9/2011 | ............... | E04B 9/16 |
| FR | 2971524 A1 * | 8/2012 | ........... | E04B 1/5818 |

OTHER PUBLICATIONS

Web pages of Light Gage Steel Frame/Structure from Beijing Hyperst Import & Export Trade Co. Ltd., date unknown, http://m.aftrade.com/4619479/6880?4619479.html.
Web pages of Alibaba SuspensionCeiling_FurringChannelBracket from EU-Baustoffhandel, date unknown, www.eu-baustoffhandel.de/Kreuzverbinder.
Web pages of Wenan Hongfa Pipe Co., Ltd. showing Suspension Ceiling Accessories furring channel clip/furring channel bracket, date unknown, www.hbhfzg.com.
Web pages of Shenzhen Pennon Decoration Material showing C Channel Clip Carrier Channel Gypsum Drywall Profiles Steel Profile, dated: Feb. 9, 2009; May 21, 2009; and Dec. 8, 2006, szpennon.en.alibaba.com.
Web pages of Shenzhen Pennon Decoration Material showing C Channel Clip Carrier Channel Gypsum Drywall Profiles Steel Profile dated Feb. 9, 2009; May 21, 2009; Dec. 8, 2006, szpennon.en.alibaba.com.
Web page of EU-Baustoffhandel, date unknown, www.eu-baustoffhandel.de/Kreuzverbinder.
Web page of ClarkDietrich Building Systems showing Metal Furring Channel Clips (MFCC), date unknown, https://www.clarkdietrich.com/products-specialty-clips-connectors/metal-furring-channel-clips-mfcc.

* cited by examiner

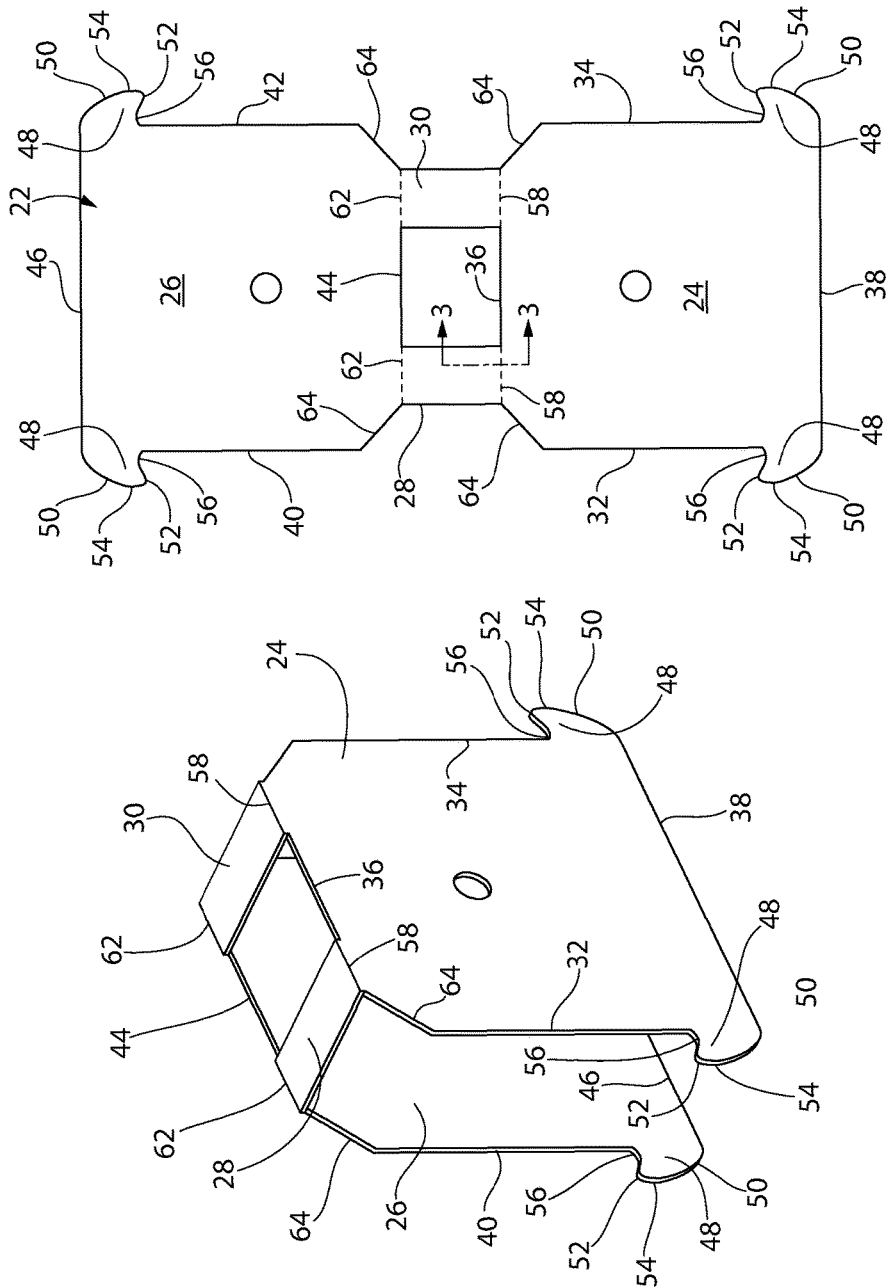

PRECURSOR FOR A FURRING CHANNEL CLIP, FURRING CHANNEL CLIP FORMED THEREFROM, METHOD OF MAKING A FURRING CHANNEL CLIP, AND METHOD OF MOUNTING A FURRING CHANNEL TO A LOAD BEARING MEMBER

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

The disclosed invention relates to clips and more particularly to clips for suspending furring channels from load-bearing members, e.g., joists of a building.

BACKGROUND OF THE INVENTION

Various types of furring channels are disclosed in the prior art and commercially available for securing a structural element, e.g., plywood, composite-board, sheetrock, etc., to it to form a ceiling for a building. Such furring channels are configured so that they are mountable on a load bearing member, such as a joist. To that end clips are commonly provided. One such clip is the Metal Furring Channel Clip (MFCC), sold by Clarkwestern Dietrich Building Systems, LLC for mounting a hat-shaped furring channel to furr out ceiling assemblies. That clip is particularly constructed for use with a t1½" cold rolled channel. That channel is commonly used as a joist and is of a general C-shape having a generally planar top wall, a generally planar bottom wall, and a generally planar sidewall connecting corresponding sides of the top and bottom walls.

Another type of furring channel is a U-shaped member having bottom wall and a pair of spaced-apart sidewalls projecting upward from the bottom wall. Each of the sidewalls terminates at a somewhat narrow inwardly directed, downward angled flange having a free edge. The free edges of the inwardly directed flanges are spaced apart by a width that is less than the width separating the sidewalls. The MFCC of Clarkwestern Dietrich Building Systems, LLC is not suitable for mounting that type of furring channel to a t1½" cold rolled load-bearing member. Thus, a need exists for a clip that can be used to mount or suspend that type of furring channel from a load-bearing member, be it a t1½" cold rolled load-bearing member or some other elongated load-bearing member having an upper surface on which the clip can be disposed. Moreover, a need exists for a precursor for a such a clip, wherein the precursor is in the form of a flat blank or sheet of material of a desired profile and which can be readily folded on site by a user to form the clip. The present invention addresses that need. In addition, the precursor and clip enable one to make use of methods of this invention to readily form the clip and readily attach it to the load-bearing member and to the furring channel to mount the furring channel on the load-bearing member

SUMMARY OF THE INVENTION

One aspect of this invention is a clip for mounting a furring channel to a load-bearing member. The load-bearing has a top surface of a first width. The furring channel is a hollow member having a bottom wall and a pair of sidewalls spaced apart by a second width and projecting upward from the bottom wall. Each of the sidewalls terminates at an inwardly directed flange having a free edge. The free edges of the inwardly directed flanges are spaced apart by a third width that is less than the second width. The clip is a generally U-shaped member that comprises a top wall configured to be disposed on the top surface of the load-bearing member, and a pair of sidewalls extending downward from the top wall. Each of the sidewalls has a side edge. Each of the side edges includes a tab projecting outward therefrom. Each of the tabs includes an inclined undersurface, a top surface, and a side edge surface. The side edge surfaces of the tabs of each of the sidewalls are spaced apart by slightly less than the second width. Respective ones of the inclined undersurfaces of the tabs are configured to slide over respective ones of the inwardly directed flanges of the furring channel to cause the sidewalls of the furring channel to flex outward, whereupon the tabs snap-fit between the sidewalls of the furring channel, with respective flanges of the furring channel being disposed on the top surface of respective tabs of the load-bearing member.

In accordance with one preferred aspect of the clip of this invention each of the flanges projects downward at an acute angle to the sidewall of the furring channel from which it projects to form a cam upper surface on each of the flanges.

In accordance with another preferred aspect of the clip of this invention the inclined undersurface of each of the tabs is convex and serves as a cam surface configured to slide with respect to the cam surface of a respective one of the tabs of the furring channel to effect the snap-fitting of the tabs between the sidewalls of the furring strip.

In accordance with another preferred aspect of the clip of this invention the top surface of each of the tabs is convex.

In accordance with another preferred aspect of the clip of this invention the sidewalls of the clip are spaced from each other by the first width.

In accordance with another preferred aspect of the clip of this invention the top wall is in the form of two bridging strips.

In accordance with another preferred aspect of the clip of this invention the clip is formed of metal.

Another aspect of this invention is a precursor for a clip for mounting a furring channel to a load-bearing member. The load-bearing member has a top surface of a first width. The furring channel is a hollow member having a bottom wall and a pair of sidewalls spaced apart by a second width and projecting upward from the bottom wall. Each of the sidewalls terminates at an inwardly directed flange having a free edge. The free edges of the inwardly directed flanges are spaced apart by a third width that is less than the second width. The precursor is a generally planar sheet comprising a first panel, a second panel and at least one intermediate panel. The first panel has an end edge, a pair of side edges, and a fold line. The fold line extends parallel to the end edge of the first panel. Each of the side edges of the first panel includes a tab projecting outward therefrom. Each of the tabs of the first panel includes an inclined undersurface and a top surface. The second panel has an end edge, a pair of side edges, and a fold line. The fold line extends parallel to the end edge of the second panel. Each of the side edges of the second panel includes a tab projecting outward therefrom. Each of the tabs of the second panel includes an inclined undersurface and a top surface. The at least one intermediate panel is interposed between the fold lines of the first and second panels. The first and second panels are configured to be folded along the fold lines into a generally U-shaped load-bearing clip to enable the at least one intermediate panel to be disposed on the top surface of the load-bearing member, with the tabs of the first and second panels configured to be snap-fit under respective portions of the flanges of the furring channel.

In accordance with one preferred aspect of the precursor the at least one intermediate panel comprises a pair of bridging strips spaced apart from each other.

In accordance with another preferred aspect of the precursor the generally planar sheet includes an upper surface and an undersurface surface, and wherein the fold lines comprise very shallow grooves in at least one of the upper surface and the under surface.

In accordance with another preferred aspect of the precursor the generally planar sheet includes an upper surface and an undersurface surface, and wherein the fold lines comprise very shallow grooves in at least one of the upper surface and the under surface.

In accordance with another preferred aspect of the precursor each of the side edges includes an angled edge portion. Each of the angled edges portion being located immediately adjacent a respective one of the fold lines.

In accordance with another preferred aspect of the precursor the top surface of each of the tabs is convex.

In accordance with another preferred aspect of the precursor each of the tabs includes a side edge surface, with the side edge surfaces of the tabs of each of the sidewalls being spaced apart by slightly less than the second width.

In accordance with another preferred aspect of the precursor the sheet is formed of metal.

Another aspect of this invention is a method of forming a clip for mounting a furring channel to a load-bearing member having a top surface. The method comprises providing precursor of the clip. The precursor is a generally planar sheet comprising a first panel, a second panel, and at least one intermediate panel. The first panel has an end edge, a pair of side edges, and a fold line. The fold line extends parallel to the end edge of the first panel. Each of the side edges of the first panel includes a tab projecting outward therefrom. Each of the tabs of the first panel includes an inclined undersurface and a top surface. The second panel has an end edge, a pair of side edges, and a fold line. The fold line extends parallel to the end edge of the second panel. Each of the side edges of the second panel includes a tab projecting outward therefrom. Each of the tabs of the second panel includes an inclined undersurface and a top surface. The at least one intermediate panel is interposed between the fold lines of the first and second panels. The sheet of material is folded along the fold lines to bring the first and second panels parallel to each other to form a generally U-shaped load-bearing clip configured to enable the at least one intermediate panel to be disposed on the top surface of the load-bearing member.

Still another aspect of this invention is a method of mounting a furring channel to a load-bearing member having a top surface of a first width. The furring channel is a hollow member having a bottom wall and a pair of sidewalls spaced apart by a second width and projecting upward from the bottom wall. Each of the sidewalls terminates at a inwardly directed flange having a upper surface and a free edge. The free edges of the inwardly directed flanges are spaced apart by a third width that is less than the second width. The method comprises providing a clip. The clip is a generally U-shaped member comprising a top wall and a pair of side walls. The top wall is configured to be disposed on the top surface of the load-bearing member. The pair of sidewalls extends downward from the top wall. Each of the sidewalls has a side edge. Each of the side edges includes a tab projecting outward therefrom. Each of the tabs includes an inclined undersurface, a top surface, and a side edge surface. The side edge surfaces of the tabs of each of the sidewalls are spaced apart by slightly less than the second width. Respective ones of the inclined undersurfaces of the tabs are configured to slide over respective ones of the inwardly directed flanges of the furring channel to cause the sidewalls of the furring channel to flex outward. The clip is disposed on the load-bearing member with the top wall disposed over the top surface of the load bearing member. The tabs of one of the side edges of the pair of sidewalls are inserted under one of the inwardly directed flanges of the furring channel. The clip is oriented with respect to the furring channel so that the inclined undersurface of the tabs of the other of the side edges of the pair of sidewalls is disposed and slides over the upper surface of the other of the inwardly directed flanges to cause the sidewall from which the other flange projects to flex outward, whereupon the tabs of the other of the side edges of the pair of sidewalls snap-fit under the other flange. This action completes the connection of the furring channel to the load-bear member by the clip.

BRIEF DESCRIPTION OF THE DRAWING FIGURES

FIG. 1 is an isometric view of the clip constructed in accordance with this invention for mounting and connecting a furring channel under an elongated load-bearing member, e.g., a metal U-shaped joist;

FIG. 2 is a plan view of a precursor sheet which is configured such that it can be readily folded to produce the clip of FIG. 1;

DETAILED DESCRIPTION OF THE PREFERRED EMBODIMENTS

Figure 3:
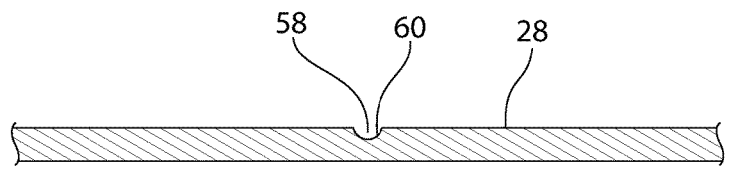
FIG. 3 is an enlarged sectional view taken along lines 3-3 of FIG. 2.
Figure 4:
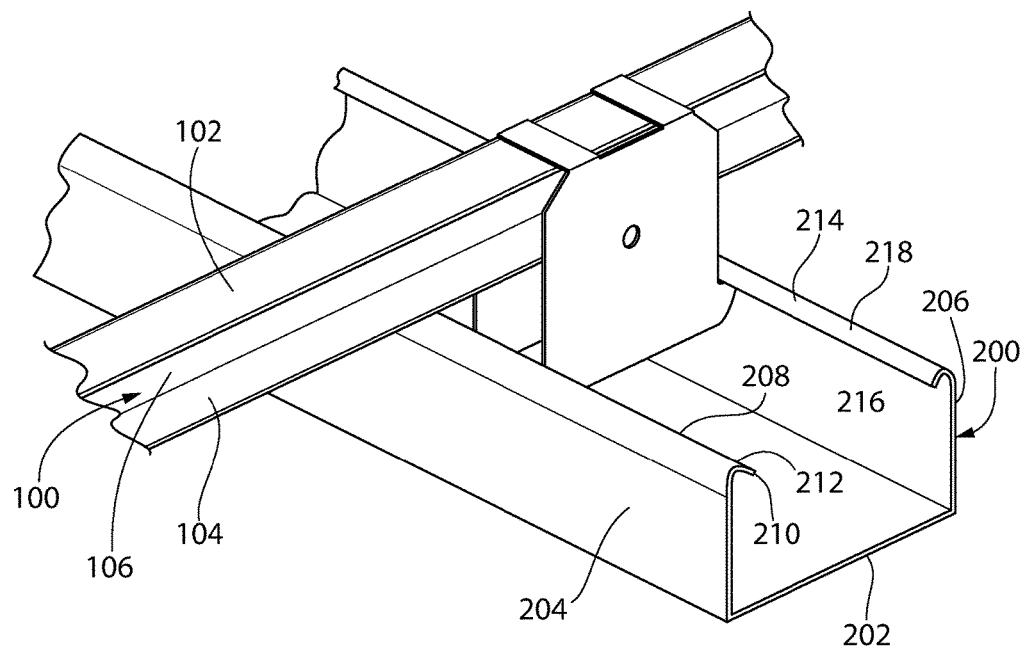
FIG. 4 is an isometric view of the clip of FIG. 1 being shown in place after it has connected a conventional U-shaped metal furring channel having an opposed pair of sidewall, each of which includes an inwardly projecting downwardly angled flange, to a conventional C-shaped joist.

Referring now to the drawings wherein like characters refer to like parts there is shown at 20 in FIG. 1 one exemplary embodiment of a clip constructed in accordance with this invention for mounting and connecting a furring channel to a load bearing member, such as a ceiling joist. The clip 20 is a generally U-shaped member configured so that it can be readily formed (folded) from a planar precursor sheet 22 at a construction site immediately before it is to be used or formed at some other location any time before the clip is to be used.

The precursor sheet is shown in FIG. 2, and will be described in detail shortly. Suffice for now to state that it is a generally planar member having a profile which defines a first sidewall of the clip, a second sidewall of the clip, and at least one intermediate bridging member interposed between the first and second sidewalls. The interface of the first and second sidewalls to the at least one intermediate bridging member is in the form of respective fold lines. Accordingly, a user can readily fold the precursor sheet along the fold lines to produce the clip 20.

As best seen in FIG. 1, the clip basically comprises a pair of sidewalls 24 and 26 formed by respective panels of the precursor sheet, and a pair of bridging strips 28 and 30 formed by respective portions of the precursor sheet. The precursor sheet may be formed of any suitable material, which is sufficiently strong to support a furring channel and the structural element(s) that will be secured to the furring channel. One particularly suitable material, is steel.

As can be seen in FIG. 2 the panel portion of the precursor sheet 22 forming the sidewall 24 of the clip 20 includes a first side edge 32, a second side edge 34, a top edge 36 and a bottom edge 38. The panel portion of the precursor sheet 22 forming the sidewall 26 includes a first side edge 40, a second side edge 42, a top edge 44 and a bottom edge 46. The first side edge 32 of the sidewall 24 is aligned with the first side edge 40 of the sidewall 26. In a similar manner the second side edge 34 of the sidewall 24 is aligned with the second side edge 42 of the sidewall 26. The junction of the side edge 32 and the bottom edge 38 of the sidewall 24 is in the form of an outwardly projecting wing or tab 48. The tab 48 includes a convex, curved undersurface 50, a convex top surface 52 and an intermediate side edge surface 54. The convex top surface 52 merges with the first side edge 32 by a concave surface 56. In a similar manner, the junction of the side edge 34 and the bottom edge 38 of the sidewall 24 is in the form of an outwardly projecting wing or tab 48. That tab 48 includes a convex, curved undersurface 50, a convex top surface 52 and an intermediate side edge surface 54. The convex top surface 52 merges with the second side edge 34 by a concave surface 56. The sidewall 26 also includes projecting wings or tabs 48. In particular, the junction of the side edge 40 and the bottom edge 46 of the sidewall 26 is in the form of an outwardly projecting wing or tab 48. That tab 48 includes a convex, curved undersurface 50, a convex top surface 52 and an intermediate side edge surface 54. The convex top surface 52 merges with the first side edge 40 by a concave surface 56. In a similar manner, the junction of the side edge 42 and the bottom edge 46 of the sidewall 26 is in the form of an outwardly projecting wing or tab 48. That tab 48 includes a convex, curved undersurface 50, a convex top surface 52 and an intermediate side edge surface 54. The convex top surface 52 merges with the second side edge 42 by a concave surface 56.

The panel portions of the precursor sheet forming the bridging strips 28 and 30 are configured as follows. One end of the bridging strip 28 merges with the sidewall 24 along a fold line 58 which is aligned with the top edge 36 of that sidewall. The fold line 58 is in the form of a very shallow linear groove 60 (FIG. 3) in the top surface of the sheet making up the clip. Alternatively, the very shallow linear groove forming the fold line 58 could be in the undersurface of the sheet making up the clip, or could be in both of the top surface and undersurface of the sheet making up the clip. In any case the groove 60 is provided to reduce the thickness of the sheet at the fold line, so that the sheet can be readily and accurately folded along that line to form the clip. One end of the other bridging strip 30 merges with the sidewall 24 along another, and identical, fold line 58, which is also aligned with the top edge 36 of the sidewall 24. In a similar manner the opposite end of the bridging strip 28 merges with the sidewall 26 along a fold line 62, the fold line 62 is aligned with the top edge 44 of that sidewall and is also in the form of a very shallow linear groove 60 in the top surface of the sheet making up the clip. Alternatively, the very shallow linear groove forming the fold line 62 could be in the undersurface of the sheet making up the clip, or could be in both of the top surface and undersurface of the sheet making up the clip. In any case the groove is provided to reduce the thickness of the sheet at the fold line 62, so that the sheet can be readily and accurately folded along that line to form the clip. One end of the other bridging strip 30 merges with the sidewall 26 along another, and identical, fold line 62, which is also aligned with the top edge 44 of the sidewall 26.

The side edge 32 of the sidewall 24 contiguous with the fold line 58 at the bridging strip 28 is in the form of an angled cut 64. Similarly, the side edge 34 of the sidewall 26 contiguous with the fold line 58 at the bridging strip 30 is in the form of an angled cut 64. The side edge 40 of the sidewall 26 contiguous with the fold line 62 at the bridging strip 28 is also in the form of an angled cut 64. Similarly, the side edge 42 of the sidewall 26 contiguous with the fold line 62 at the bridging strip 30 is in the form of an angled cut 64.

The precursor sheet 22 as described above can be readily formed into the clip 20 by merely folding the two panel portions of the sheet which define the sidewalls 24 and 26 along the fold lines 58 and 62 so that those two portions confront each other and are parallel to each other. In accordance with one preferred aspect of this invention, the two bridging strips 28 and 30 are of the same length, so that when the panel portions of the precursor sheet forming the sidewalls 24 and 26 are folded towards each other along their fold lines 58 and 62 they will be separated by a predetermined distance or width. That predetermined width is preferably the width of a top surface of the load-bearing member onto which the clip is to be mounted.

It should be pointed out at this juncture that the two portions of the precursor sheet defining the strips 28 and 30 can be replaced by a single strip, or by more than two strips, depending upon the application that the clip is to be put and the size of the load-bearing member and the size of the furring channel.

It should also be pointed out that while the exemplary embodiment of the clip described above is configured to be folded on-site or before into its U-shape from a planar precursor sheet, that is merely exemplary. Thus, the subject invention contemplates that the clip can be pre-formed. In fact, for some applications it is contemplated that the clip can be stamped into its clip shape. Alternatively, it can be molded so that when removed from the mold it is already in its U-shaped configuration. Hence the clip need not include any foldable portions.

One method of using the clip 20 to mount a furring channel to a load-bearing member will now be described with reference to FIGS. 4-7. In particular, as can be seen the load bearing member 100 is in the form of a conventional t1½" cold rolled C-shaped channel or joist. That channel is an integral body including a planar top wall 102, a planar bottom wall 104 and a sidewall 106 bridging the top and bottom walls. The top and bottom wall are of the same width. Moreover, in this embodiment the top wall and bottom wall are the same width as the distance separating the top edges of the two sidewalls 24 and 26 of the clip 20, i.e., the length of the bridging strips 28 and 30. Thus, when the clip 20 is completely mounted on the joist 100 one sidewall of the clip will confront and engage the outer surface of the sidewall 106 of the joist, with the other sidewall of the clip confronting and engaging the free edges of the top wall 102 and bottom wall 104 of the joist.

The furring channel 200 is in the form of a conventional U-shaped channel having a planar bottom wall 202, from which a pair of planar sidewalls 204 and 206 project upward, with those sidewalls being parallel to each other and spaced apart by a predetermined distance. The top end of each of the sidewalls is in the form of a narrow inwardly projecting flange. In particular, the sidewall 204 includes a narrow inwardly projecting flange 208. The flange 208 extends not only inward, but slightly downward at an acute angle towards the bottom wall 202 and terminates in a linear free edge 210. The slightly downward orientation of the flange 208 results in its top surface 212 being in the form of a cam surface. In a similar manner the sidewall 206 includes a narrow inwardly projecting flange 214. The flange 214 extends not only inward, but slightly downward at an acute angle towards the bottom wall 202 and terminates in a linear free edge 216. The slightly downward orientation of the flange 214 results in its top surface 218 being in the form of a cam surface.

Figure 5:
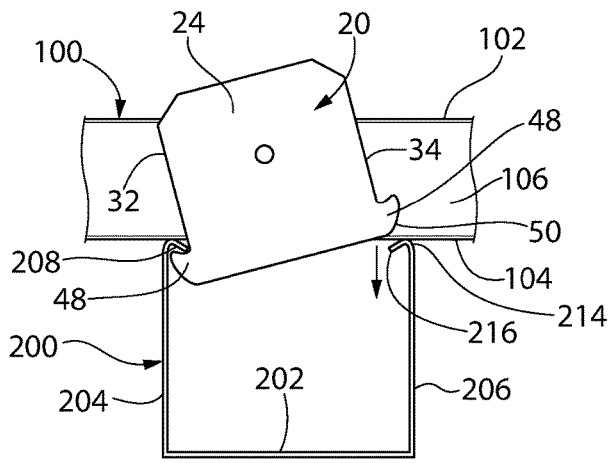
FIG. 5 is an illustration of an initial step in the process of connecting the clip of FIG. 1 to the furring channel of FIG. 4, after the clip has been disposed on the C-shaped joist, wherein tabs on one side of the clip are inserted under the downwardly angled flange at one of the sidewalls of the furring channel.
Figure 6:
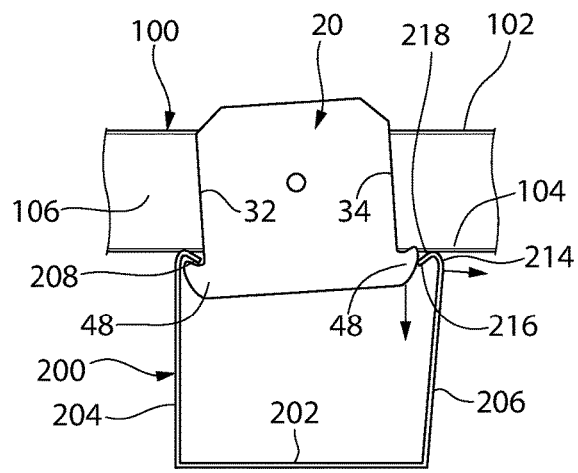
FIG. 6 is an illustration, similar to FIG. 5, but showing a subsequent step in the process of connecting the clip of FIG. 1 to the furring channel, wherein tabs on the other side of the clip are starting to cause the other sidewall of the furring channel to flex outward so that those tabs may be snap-fit under the flange of that other sidewall.
Figure 7:
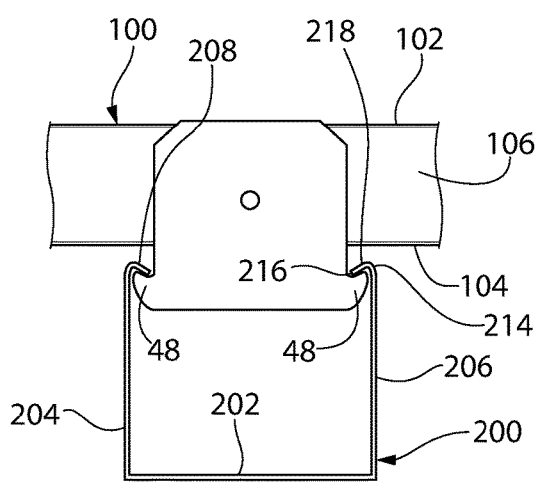
FIG. 7 is an illustration, similar to FIGS. 4 and 5, but showing a the clip in its final position snap-fit within the furring channel.
Figure 8:
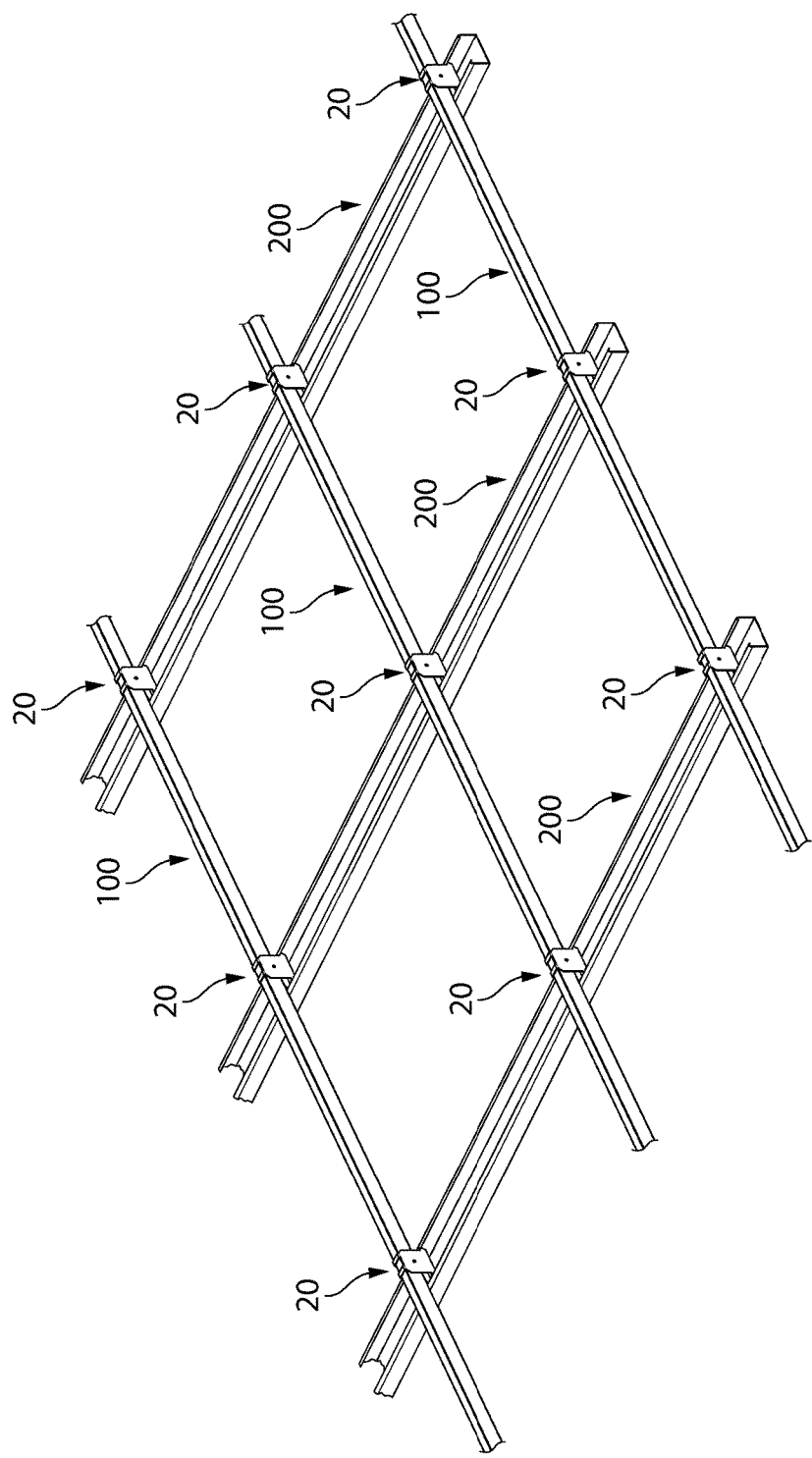
FIG. 8 is an illustration of the interior of a static structure wherein a plurality of joists (like shown in FIG. 4) are

With the furring channel 200 supported such that it is located immediately below the joist 100 with the top surfaces of the furring channel's flanges 208 and 214 in engagement with the undersurface of bottom wall 104 of the joist, the clip 20 is ready to connect and mount the furring channel to the joist. To that end, the clip 20 is disposed on the joist 100 by juxtaposing the bottom edges 38 and 46 toward the top wall 102 of the joist and then moving the clip so that the top wall 102 of the joist is interposed between the clip's sidewalls 24 and 26. The clip 20 is then oriented, e.g., tilted, downward so that the tabs 48 extending from one side edge of the sidewalls 24 and 26, are located within the interior of the furring channel and under the one of its flanges. In the illustrations of FIGS. 5-7 the tabs 48 extending from the sidewalls 24 and 26 at the side edges 32 and 40, respectively, are located within the interior of the furring channel 200 under the flange 208. The opposite side of the clip 20 is then be pressed and rotated downward, whereupon the curved undersurface 50 of the other two tabs 48 will engage and slide over the cam surface 218 of the flange 214 as shown in FIG. 6. This action will have the effect of flexing or bowing out the portion of the sidewall from which the flange 214 projects. Continued downward movement (rotation) of the clip will cause the curved or cam undersurface 50 of the tabs 48 to slide over the cam surface 218 until the edge portions 54 of those tabs pass the free edge 216 of the flange 214, whereupon the tabs will snap-fit under the flange. Accordingly the underside of the bridging strips 28 and 30 will engage the top surface of the top wall 102 of the joist, thereby tightly connecting the furring channel to the joist.

Other furring channels can be similarly connected to the joist and to other joists to result in a ceiling mounting system like shown in FIG. 7.

It should be pointed out at this juncture that the clip 20 as described above is merely exemplary. Thus, various changes can be made to portions of it within the context of this invention so long as it includes at least one sidewall with wings or tabs configured to be snap-fit under inwardly projecting flanges of a furring channel. Moreover, while the clip has been disclosed for use with a conventional U-shaped furring channel and C-shaped load-bearing member or joist, it should be clear that the clip of this invention has much broader application. For example, it can be used with any load-bearing member to mount and connect a furring strip below it. Thus, the load-bearing member can be formed of wood, metal, or some other strong material. Moreover the load bearing member can be hollow or solid, and can be of any shape providing it has a top surface upon which the top wall of the clip of this invention can be disposed. So too, the furring channel can take various shapes so long as it includes a pair of inwardly directed flanges, under which the wings or tabs of the subject clip can be snap-fit.

Without further elaboration the foregoing will so fully illustrate my invention that others may, by applying current or future knowledge, adopt the same for use under various conditions of service.

I claim:

1. A clip for mounting a furring channel to a load-bearing member, the load-bearing member having a top surface of a first width, the furring channel being a hollow member having a bottom wall and a pair of sidewalls spaced apart by a second width and projecting upward from the bottom wall, each of said sidewalls terminating at a inwardly directed flange having a free edge, the free edges of the inwardly directed flanges being spaced apart by a third width that is less than the second width, said clip being a generally U-shaped member comprising:

a) a top wall configured to be disposed on the top surface of the load-bearing member, said top wall comprising two bridging strips, each of said bridging strips being a planar member having an outside edge, an inside edge, a first end and a second end, and a predetermined length measured from said first end to said second end, said inside edge of one of said bridging strips being separated from said inside edge of the other of said bridging strips by an opening extending the full length of each of said bridging strips between said first and second ends, each of said bridging strips including a planar undersurface; and b) a pair of sidewalls extending downward from said top wall, said pair of sidewalls comprising a first sidewall and a second sidewall, said first sidewall being connected to each of said bridging strips along said first end of each of said bridging strips, said second sidewall being connected to each of said bridging strips along said second end of each of said bridging strips, whereupon said opening is located between said first and second sidewalls, each of said first and second sidewalls having two side edges and two inwardly directed angled edges, one of said inwardly directed angled edges of said first sidewall merging with said first end of one of said bridging strips adjacent said outside edge of said one of said bridging strips, the other of said inwardly directed angled edges of said first sidewall merging with said first end of the other of said bridging strips adjacent said outside edge of said other of said bridging strips, one of said inwardly directed angled edges of said second sidewall merging with said second end of one of said bridging strips adjacent said outside edge of said one of said bridging strips, the other of said inwardly directed angled edges of said second sidewall merging with said second end of the other of said bridging strips adjacent said outside edge of said other of said bridging strips, said side edges of each of said first and second sidewalls extending generally parallel to each other being spaced from each other by a distance greater than the distance between said outside edges of said bridging strips, each of said side edges of each of said first and second sidewalls including a tab projecting outward therefrom, each of said tabs including an inclined undersurface, a top surface, and a side edge surface, said side edge surfaces of said tabs of each of said sidewalls being spaced apart by less than the second width, respective ones of said inclined undersurfaces of said tabs being configured to slide over respective ones of the inwardly directed flanges of the furring channel to cause the sidewalls of the furring channel to flex outward, whereupon said tabs snap-fit between the sidewalls of the furring channel, with respective flanges of the furring channel being disposed on said top surface of respective tabs of said clip and with said planar undersurface of said bridging strips engaging the top surface of the load-bearing member.

2. The clip of claim 1, wherein each of said flanges projects downward at an acute angle to the sidewall of the furring channel from which it projects to form a cam upper surface on each of said flanges.

3. The clip of claim 2 wherein said inclined undersurface of each of said tabs is convex and serves as a cam surface configured to slide with respect to the cam surface of a respective one of the tabs of the furring channel to effect the snap fitting of the tabs between the sidewalls of the furring strip.

4. The clip of claim 3, wherein said top surface of each of said tabs is convex.

5. The clip of claim 1, wherein said sidewalls of said clip are spaced from each other by said first width.

6. The clip of claim 1, wherein said clip is formed of metal.

7. A precursor for a clip for mounting a furring channel to a load-bearing member, the load-bearing member having a top surface of a first width, the furring channel being a hollow member having a bottom wall and a pair of sidewalls spaced apart by a second width and projecting upward from the bottom wall, each of said sidewalls terminating at an inwardly directed flange having a free edge, the free edges of the inwardly directed flanges being spaced apart by a third width that is less than the second width, said precursor being a generally planar unitary sheet comprising:

a) a first panel having an end edge, a first side edge, a second side edge, a first angled edge, a second angled edge, and a first fold line, said first fold line extending parallel to said end edge of said first panel, said first side edge of said first panel extending parallel to said second side edge of said first panel, said first angled edge of said first panel extending inward at an angle from said first side edge of said first panel to said first fold line, said second angled edge of said first panel extending inward at an angle from said second side edge of said first panel to said first fold line, each of said first and second side edges of said first panel including a tab projecting outward therefrom, each of said tabs of said first panel including an inclined undersurface and a top surface;

b) a second panel having an end edge, a first side edge, a second side edge, a first angled edge, a second angled edge, and a second fold line, said second fold line extending parallel to said end edge of said second panel, said first side edge of said second panel extending parallel to said second side edge of said second panel, said first angled edge of said second panel extending inward at an angle from said first side edge of said second panel to said second fold line, said second angled edge of said second panel extending inward at an angle from said second side edge of said second panel to said second fold line, each of said first and second side edges of said second panel including a tab projecting outward therefrom, each of said tabs of said second panel including an inclined undersurface and a top surface; and c) a pair of bridging strips interposed between said first and second fold lines, each of said bridging strips having an outside edge, an inside edge, a first end, a second end, and a predetermined length measured from said first end to said second end, said first end of each of said bridging strips forming said first fold line, said second end of each of said bridging strips forming said second fold line, said inside edge of one of said bridging strips being separated from said inside edge of the other of said bridging strips by an opening extending the full length of each of said bridging strips between said first and second fold lines, each of said bridging strips including a planar undersurface, said first and second panels being configured to be folded along said first and second fold lines into a generally U-shaped load-bearing clip to enable said planar undersurface of said bridging strips to be disposed on the top surface of the load-bearing member, with the tabs of said first and second panels configured to be snap-fit under respective portions of the flanges of the furring channel.

8. The precursor of claim 7, wherein said generally planar sheet includes an upper surface and an undersurface surface, and wherein said first and second fold lines comprise grooves in at least one of said upper surface and said under surface.

9. The precursor of claim 7, wherein said top surface of each of said tabs is convex.

10. The precursor of claim 7, wherein, each of said tabs includes a side edge surface, with said side edge surfaces of said tabs of each of said sidewalls being spaced apart by less than the second width.

11. The precursor of claim 7, wherein said sheet is formed of metal.

12. A method of forming a clip for mounting a furring channel to a load-bearing member having a top surface, the furring channel being a hollow member having a bottom wall and a pair of sidewalls spaced apart by a second width and projecting upward from the bottom wall, each of said sidewalls terminating at an inwardly directed flange, said method comprising:

a) providing precursor of said clip, said precursor being a generally planar sheet comprising:

(1) a first panel having an end edge, a first side edge, a second side edge, a first angled edge, a second angled edge, and a first fold line, said first fold line extending parallel to said end edge of said first panel, said first side edge of said first panel extending parallel to said second side edge of said first panel, said first angled edge of said first panel extending inward at an angle from said first side edge of said first panel to said first fold line, said second angled edge of said first panel extending inward at an angle from said second side edge of said first panel to said first fold line, each of said first and second side edges of said first panel including a tab projecting outward therefrom, each of said tabs of said first panel including an inclined undersurface and a top surface;
(2) a second panel having an end edge, a second side edge, a second side edge, a first angled edge, a second angled edge, and a second fold line, said second fold line extending parallel to said end edge of said second panel, said first side edge of said second panel extending parallel to said second side edge of said second panel, said first angled edge of said second panel extending inward at an angle from said first side edge of said second panel to said second fold line, said second angled edge of said second panel extending inward at an angle from said second side edge of said second panel to said second fold line, each of said first and second side edges of said second panel including a tab projecting outward therefrom, each of said tabs of said second panel including an inclined undersurface and a top surface;
(3) a pair of bridging strips interposed between said first and second fold lines, each of said bridging strips having an outside edge, an inside edge, a first end, a second end, and a predetermined length measured from said first end to said second end, said first end of each of said bridging strips forming said first fold line, said second end of each of said bridging strips forming said second fold line, said inside edge of one of said bridging strips being separated from said inside edge of the other of said bridging strips by an opening extending the full length of each of said bridging strips between said first and second fold lines, each of said bridging strips including a planar undersurface; and
b) folding said sheet of material along said first and second fold lines to bring said first and second panels parallel to each other to form a generally U-shaped load-bearing clip configured to enable said planar undersurface of said bridging strips to be disposed on the top surface of the load-bearing member, and with said tabs of said first and second panels snap-fit under respective portions of the flanges of the furring channel.

13. A method of mounting a furring channel to a load-bearing member having a top surface of a first width, the furring channel being a hollow member having a bottom wall and a pair of sidewalls spaced apart by a second width and projecting upward from the bottom wall, each of said sidewalls terminating at a inwardly directed flange having a upper surface and a free edge, the free edges of the inwardly directed flanges being spaced apart by a third width that is less than the second width, said method comprising:
a) providing a clip, said clip being a generally U-shaped member comprising:
(1) a top wall configured to be disposed on the top surface of the load-bearing member, said top wall comprising two bridging strips, each of said bridging strips being a planar member having an outside edge, an inside edge, a first end and a second end, and a predetermined length measured from said first end to said second end, said inside edge of one of said bridging strips being separated from said inside edge of the other of said bridging strips by an opening extending the full length of each of said bridging strips between said first and second ends, each of said bridging strips including a planar undersurface; and
(2) a pair of sidewalls extending downward from said top wall, said pair of sidewalls comprising a first sidewall and a second sidewall, said first sidewall being connected to each of said bridging strips along said first end of each of said bridging strips, said second sidewall being connected to each of said bridging strips along said second end of each of said bridging strips, whereupon said opening is located between said first and second sidewalls, each of said first and second sidewalls having two side edges and two inwardly directed angled edges, one of said inwardly directed angled edges of said first sidewall merging with said first end of one of said bridging strips adjacent said outside edge of said one of said bridging strips, the other of said inwardly directed angled edges of said first sidewall merging with said first end of the other of said bridging strips adjacent said outside edge of said other of said bridging strips, one of said inwardly directed angled edges of said second sidewall merging with said second end of one of said bridging strips adjacent said outside edge of said one of said bridging strips, the other of said inwardly directed angled edges of said second sidewall merging with said second end of the other of said bridging strips adjacent said outside edge of said other of said bridging strips, said side edges of each of said first and second sidewalls extending generally parallel to each other being spaced from each other by a distance greater than the distance between said outside edges of said bridging strips, each of said side edges of each of said first and second sidewalls including a tab projecting outward therefrom, each of said tabs including an inclined undersurface, a top surface, and a side edge surface, said side edge surfaces of said tabs of each of said sidewalls being spaced apart by less than the second width, respective one of said inclined undersurfaces of said tabs being configured to slide over respective ones of the inwardly directed flanges of the furring channel to cause the sidewalls of the furring channel to flex outward;
b) disposing said clip on said load-bearing member with said top wall disposed over said top surface of said load bearing member;
c) inserting the tabs of one of said side edges of said pair of sidewalls under one of said inwardly directed flanges of said furring channel; and
d) orienting the clip with respect to said furring channel so that said inclined undersurface of the tabs of the other of said side edges of said pair of sidewalls is disposed and slides over said upper surface of the other of said inwardly directed flanges to cause the sidewall from which said other flange projects to flex outward, whereupon said tabs of said other of said side edges of said pair of sidewalls snap-fit under said other flange, thereby completing the connection of said furring channel to said load-bear member by said clip.

* * * * *